(12) United States Patent
Ravichandran et al.

(10) Patent No.: US 12,221,945 B2
(45) Date of Patent: Feb. 11, 2025

(54) SYSTEM AND METHOD FOR CONTROLLING ENGINE STARTING DURING A DOWNSHIFT

(71) Applicant: Ford Global Technologies, LLC, Dearborn, MI (US)

(72) Inventors: Maruthi Ravichandran, Dearborn, MI (US); Marin Assaliyski, Dearborn, MI (US); Akshay Bichkar, Ann Arbor, MI (US); Naginder Gogna, Northville, MI (US); Rajit Johri, San Francisco, CA (US); Corey James Blue, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 17/661,617

(22) Filed: May 2, 2022

(65) Prior Publication Data

US 2023/0349351 A1    Nov. 2, 2023

(51) Int. Cl.
*F02N 11/08*    (2006.01)
*B60W 10/02*    (2006.01)
(Continued)

(52) U.S. Cl.
CPC ......... *F02N 11/0851* (2013.01); *B60W 10/02* (2013.01); *B60W 10/06* (2013.01);
(Continued)

(58) Field of Classification Search
CPC ......... F02N 11/0851; F02N 2200/0802; F02N 5/04; F02N 11/04; B60W 10/02; B60W 10/06; B60W 10/08; B60W 10/11; B60W 20/40; B60W 2510/0208; B60W 2710/1005; B60W 20/20; B60W 20/30; B60K 6/48; B60K 2006/268; B60K 2006/4825; B60K 6/26; Y02T 10/62
See application file for complete search history.

(56) References Cited

U.S. PATENT DOCUMENTS 8,594,913 B2    11/2013    Steuernagel
9,731,710 B2    8/2017    Gibson et al.
(Continued)

FOREIGN PATENT DOCUMENTS

DE    102010060681 A1    5/2012

OTHER PUBLICATIONS

Ravichandran, M. et al., "Methods and System for Starting an Engine," U.S. Appl. No. 17/443,925, filed Jul. 28, 2021, 35 pages.
(Continued)

*Primary Examiner* — Aniss Chad
*Assistant Examiner* — Christine Nguyen Huynh
(74) *Attorney, Agent, or Firm* — David Kelley; McCoy Russell LLP (57) ABSTRACT

Systems and methods for managing starting of an internal combustion engine during shifting of a transmission of a hybrid vehicle are presented. In one example, torque converter impeller speed or a torque multiplication ratio may be indicative of an unintended transmission downshift during engine starting so that an engine starting device may be switched to improve vehicle operation.

15 Claims, 4 Drawing Sheets

(51) Int. Cl.
  *B60W 10/06* (2006.01)
  *B60W 10/08* (2006.01)
  *B60W 10/11* (2012.01)
  *B60W 20/40* (2016.01)
(52) U.S. Cl.
  CPC ............ *B60W 10/08* (2013.01); *B60W 10/11* (2013.01); *B60W 20/40* (2013.01); *F02N 2200/0802* (2013.01)

(56) References Cited

U.S. PATENT DOCUMENTS

| | | | |
|---|---|---|---|
| 10,272,907 | B2 | 4/2019 | Johri et al. |
| 10,450,979 | B2 | 10/2019 | Gibson et al. |
| 11,130,485 | B2 | 9/2021 | Nefcy et al. |
| 2009/0252622 | A1* | 10/2009 | Tryon .................... B60K 6/365 417/364 |
| 2013/0296100 | A1 | 11/2013 | Nefcy et al. |
| 2013/0296121 | A1 | 11/2013 | Gibson et al. |
| 2013/0296124 | A1* | 11/2013 | Pietron .................... B60K 6/26 180/65.265 |
| 2013/0297187 | A1* | 11/2013 | Doering .............. F02N 11/0844 701/104 |
| 2015/0274155 | A1* | 10/2015 | Nefcy .................... B60W 10/11 180/65.265 |
| 2017/0259808 | A1 | 9/2017 | Makled et al. |
| 2017/0259810 | A1 | 9/2017 | Zhang et al. |
| 2017/0305413 | A1 | 10/2017 | Yamazaki et al. |
| 2018/0306157 | A1 | 10/2018 | Lee et al. |
| 2018/0340503 | A1 | 11/2018 | Kim |
| 2019/0376483 | A1* | 12/2019 | Khafagy ................. F02N 15/06 |
| 2020/0080527 | A1 | 3/2020 | Khafagy et al. |
| 2022/0097677 | A1* | 3/2022 | Meyer .................. B60W 20/40 |

OTHER PUBLICATIONS

Ravichandran, M. et al., "Methods and System for Controlling an Engine," U.S. Appl. No. 17/449,209, filed Sep. 28, 2021, 42 pages.
Ravichandran, M. et al., "Methods and System for Reserving Torque for Engine Starting," U.S. Appl. No. 17/449,216, filed Sep. 28, 2021, 41 pages.

* cited by examiner

SYSTEM AND METHOD FOR CONTROLLING ENGINE STARTING DURING A DOWNSHIFT

FIELD

The present description relates to methods and a system for providing smooth driveline operation during transmission gear downshifting and engine starting.

BACKGROUND AND SUMMARY

A hybrid vehicle may travel at times under propulsive effort power that is provided solely via an electric machine. However, if driver demand torque or power increases beyond a threshold amount of torque or power, the hybrid vehicle's engine may be started to provide the driver demand power or to provide the driver demand power in conjunction with the electric machine. The engine may be started in different ways. For example, the engine may be started via a flywheel starter or via closing a driveline disconnect clutch and rotating the engine via a same machine that provides the propulsive effort. If the engine is started via the flywheel starter, it may take longer than may be desired before engine power may be delivered to the hybrid vehicle's wheels. Conversely, if the engine is started via the driveline disconnect clutch and a transmission downshift occurs while the engine is being started by closing the driveline disconnect clutch, a driveline torque disturbance may be felt by occupants of the hybrid vehicle. Therefore, it may be desirable to provide a way of starting the engine that may reduce a possibility of driveline torque disturbances.

The inventors herein have recognized the above-mentioned issues and have developed a method for operating a vehicle, comprising: via a controller, starting an internal combustion engine via a flywheel starter in response to an engine start request while a driveline disconnect clutch is operating in a fully released phase or a boosting phase and based on a target torque converter impeller speed and a target torque multiplication ratio; and starting the internal combustion engine via a driveline disconnect clutch and an electric machine in response to the engine start request while the driveline disconnect clutch is not operating in the fully released phase or the boosting phase.

By controlling which of two engine starting devices is applied to start an engine based on a boosting phase of a driveline disconnect clutch and torque converter impeller speed of a target transmission gear or a torque multiplication ratio of the target transmission gear, it may be possible to select a device for starting the engine so that driveline performance and driveline torque disturbances meet vehicle objectives. For example, if the transmission is predicted to downshift to an expected or intended gear (e.g., one numerically lower gear than was engaged immediately before an engine start was most recently requested, such as from $3^{rd}$ gear to $2^{nd}$ gear), then the engine may be started via the driveline disconnect clutch so that the driveline may quickly switch to hybrid or engine only mode where engine torque is available to propel the vehicle. On the other hand, if the transmission is predicted to downshift to an unexpected or unintended gear (e.g., two or more numerically lower gears than was engaged immediately before the engine start was most recently requested, such as from $3^{rd}$ gear to $1^{st}$ gear), then the engine may be started via a flywheel starter so that the driveline may not experience a torque disturbance that is larger than may be desired.

The present description may provide several advantages. In particular, the approach may improve hybrid driveline operation during transmission gear shifting. Further, the approach may reduce driveline torque disturbances. Additionally, the approach may improve a vehicle's response and drivability.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
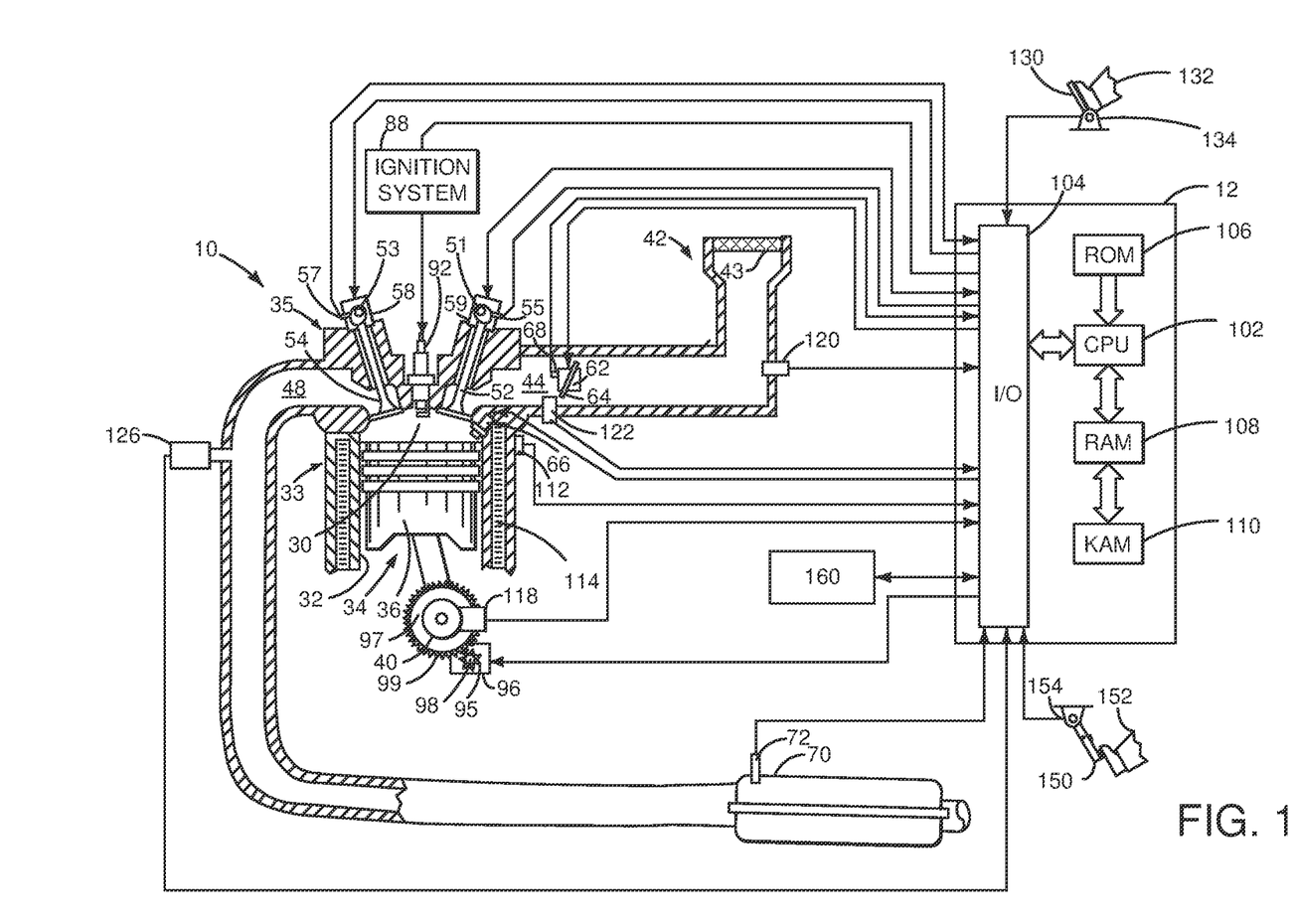
FIG. 1 is a schematic diagram of an engine.
Figure 2:
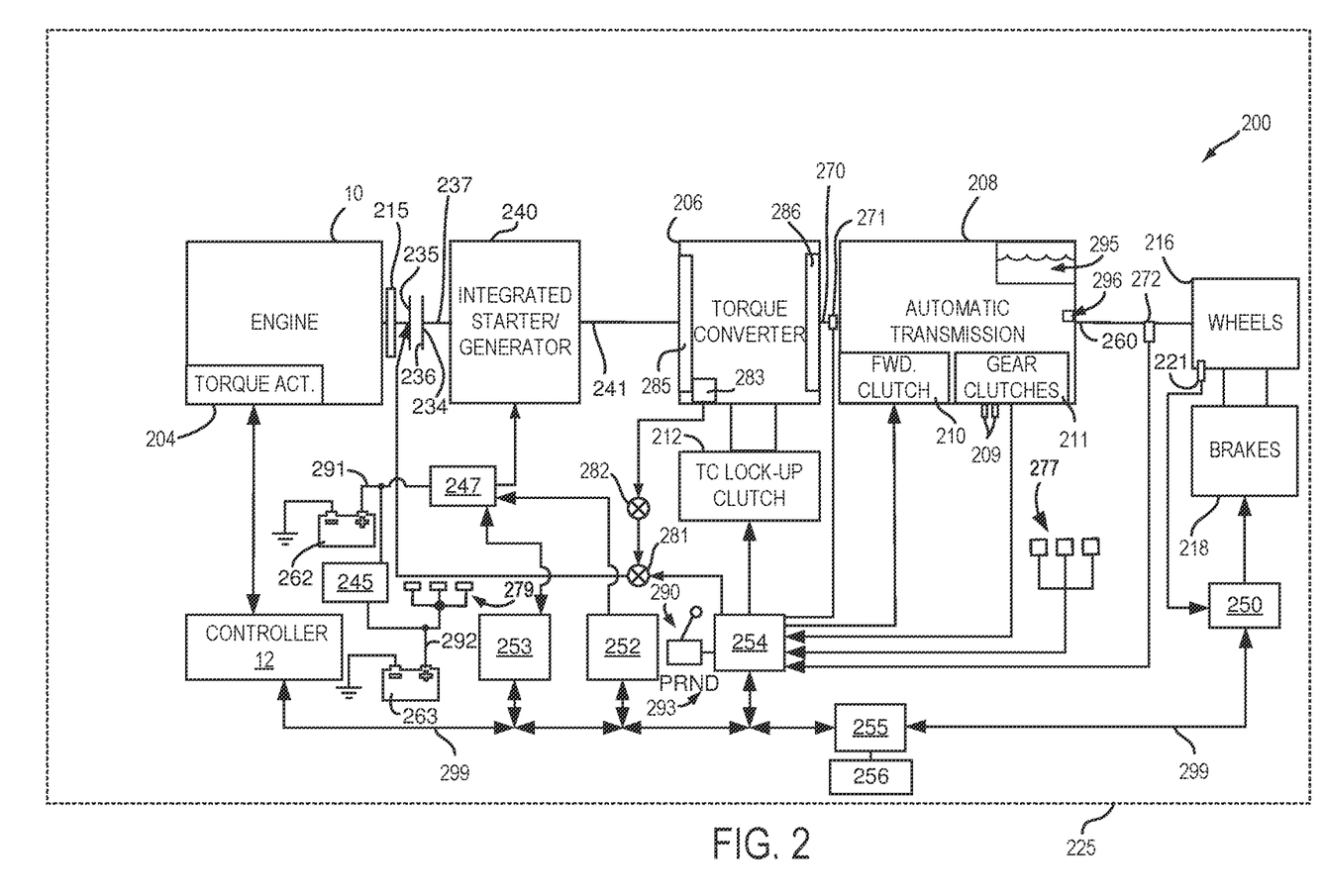
FIG. 2 is a schematic diagram of a hybrid vehicle driveline including the engine of FIG. 1.
Figure 3:
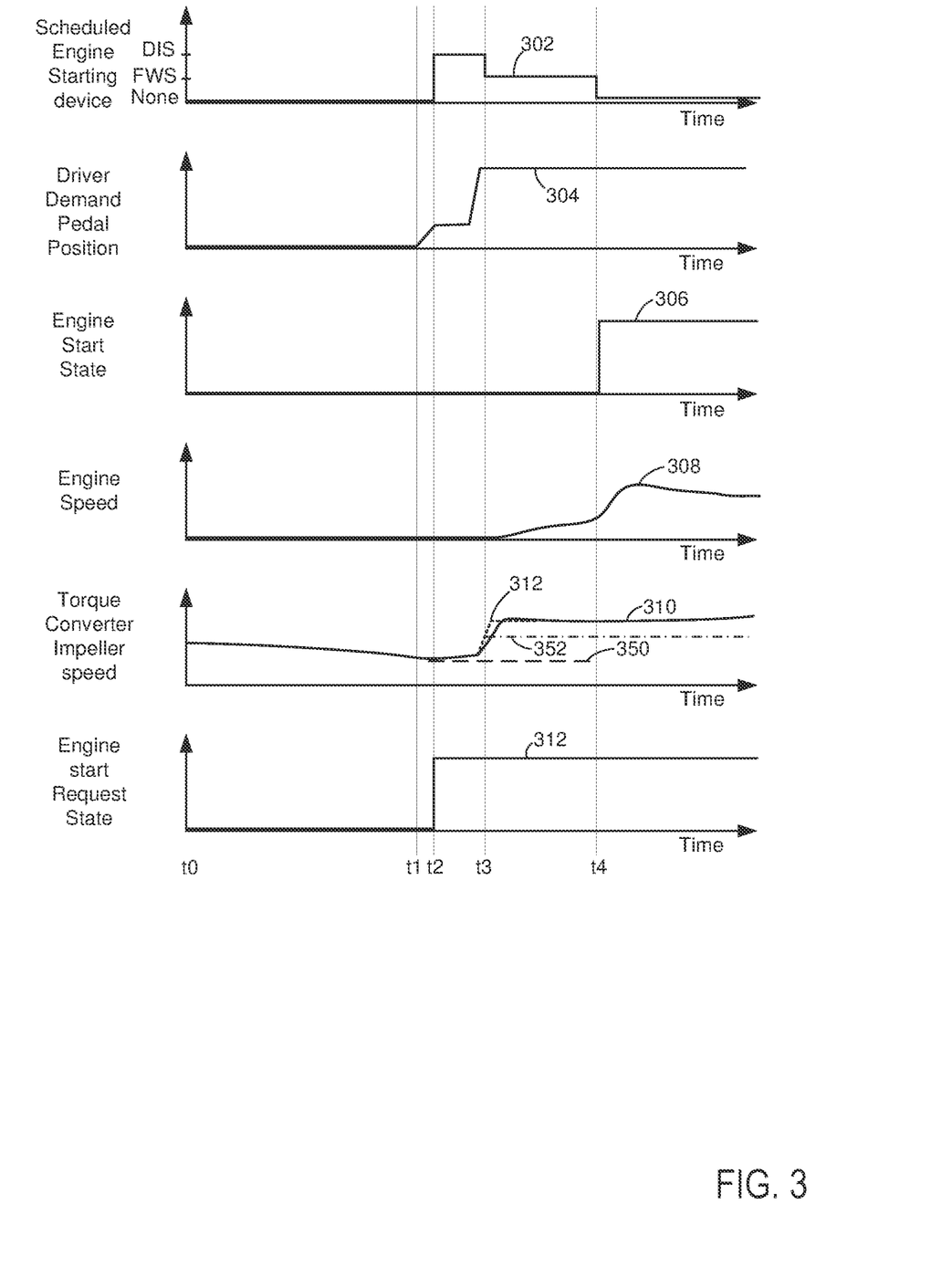
FIG. 3 shows example engine starting sequences according to the method of FIG. 4.
Figure 4:
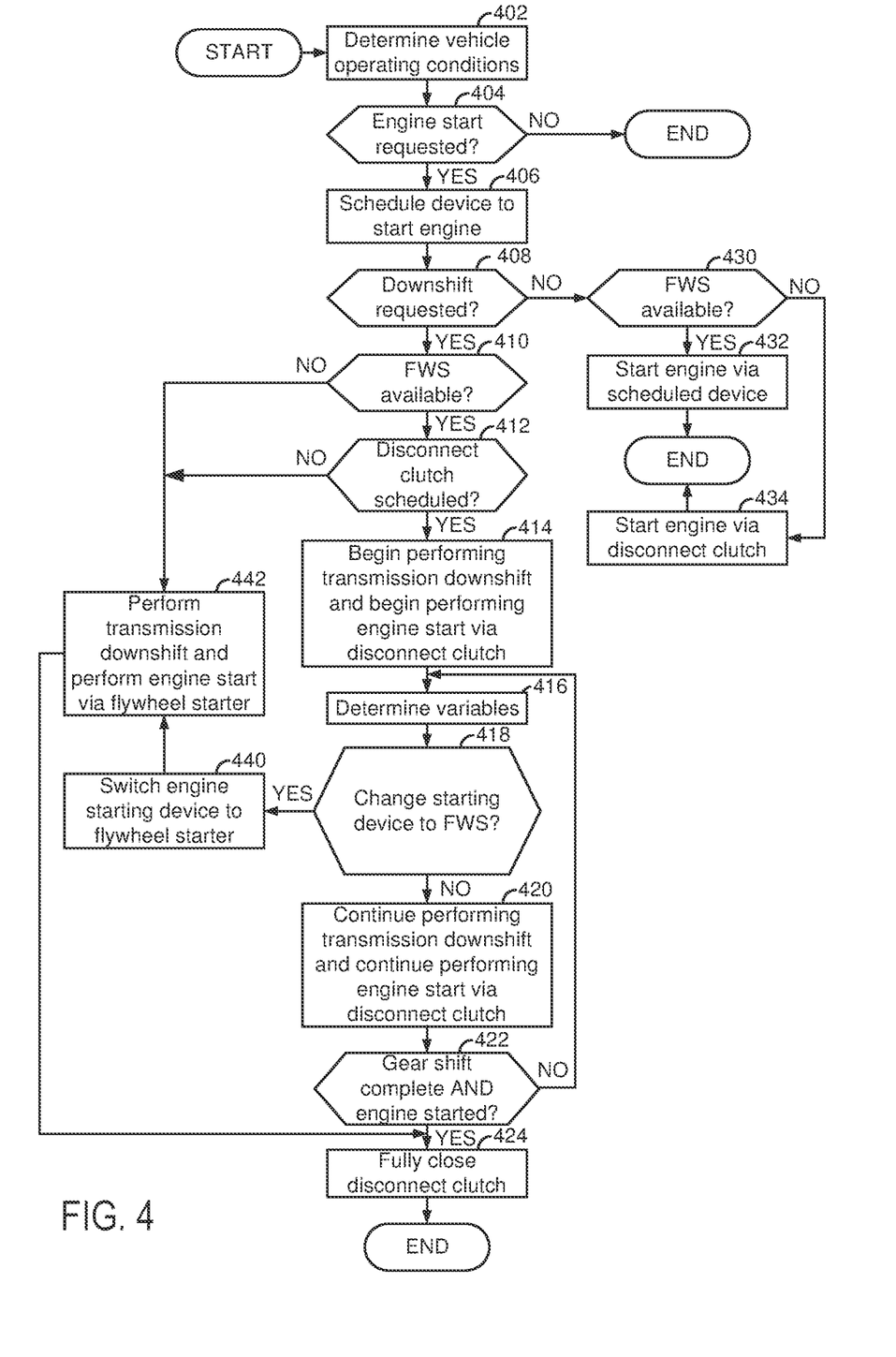
FIG. 4 shows a method for starting an engine of a hybrid vehicle.

The present description is related to improving engine starting of a hybrid vehicle. In particular, starting of an engine may be improved when a transmission is downshifting at a same time as an engine start is requested. The engine starting may be improved by selecting and scheduling an engine starting device according to a predicted or target transmission gear so that desirable driveline response and torque delivery may be achieved. The engine to be started may be of the type that is shown in FIG. 1. The engine may be part of a hybrid powertrain or driveline as shown in FIG. 2. An operating sequence according to the methods of FIG. 4 is shown in FIG. 3. FIG. 4 shows a flowchart of a method for controlling engine starting during a transmission gear downshift.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 30 volts) electric machine) includes pinion shaft 98 and pinion gear 95. Pinion shaft 98 may selectively advance pinion gear 95 to engage ring gear 99. Flywheel starter 96 may be directly mounted to the front of the engine or the rear of the engine. In some examples, flywheel starter 96 may selectively supply torque to crankshaft 40 via a belt or chain. In one example, flywheel starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electromechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of driveline disconnect clutch 236 is shown mechanically coupled to electric machine input shaft 237.

Electric machine 240 may be operated to provide power to driveline 200 or to convert powertrain power into electrical energy to be stored in electric energy storage device 262 in a regeneration mode. Electric machine 240 is in electrical communication with electric energy storage device 262. Electric machine 240 has a higher output power capacity than flywheel starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electric energy storage device 262 (e.g., high voltage battery or power source, which may be referred to as a traction battery) may be a battery, capacitor, or inductor. The downstream side of electric machine 240 is mechanically coupled to the torque converter impeller 285 of torque converter 206 via shaft 241. The upstream side of the electric machine 240 is mechanically coupled to the disconnect clutch 236. Electric machine 240 may provide a positive power or a negative power to driveline 200 via operating as a motor or generator as instructed by electric machine controller 252.

Torque converter 206 includes a torque converter turbine 286 to output power to input shaft 270. Input shaft 270 mechanically couples torque converter 206 to automatic transmission 208. Torque converter 206 also includes a torque converter lock-up clutch 212 (TCC). Power is directly transferred from torque converter impeller 285 to torque converter turbine 286 when the TCC is locked. The TCC is electrically operated by transmission controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate driveline disconnect clutch 236, forward clutch 210, and gear clutches 211. Pump 283 is driven via torque converter impeller 285, which rotates at a same speed as electric machine 240.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via brake controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1-N(where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if brake controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an integrated starter/generator; a disconnect clutch positioned in a driveline between the internal combustion engine and the integrated starter/generator; a transmission included in the driveline; a flywheel starter; and a controller including executable instructions stored in non-transitory memory that cause the controller to switch from scheduling starting the internal combustion engine via the disconnect clutch to starting the internal combustion engine via the flywheel starter in response to a difference between a torque converter impeller speed for a target transmission gear and a latched torque converter impeller speed. In a first example, the system further comprises additional instructions to switch from scheduling starting the internal combustion engine via the disconnect clutch to starting the internal combustion engine via the flywheel starter in response to a difference between a target torque multiplication ratio of the target transmission gear and a latched torque multiplication ratio. In a second example that may include the first example, the system includes where the internal combustion engine is started via the flywheel starter in further response to an engine start request. In a third example that may include one or both of the first and second examples, the system includes where the latched torque converter impeller speed is a speed of a torque converter impeller immediately preceding the engine start request. In a fourth example that may include one or more of the first through third examples, the system further comprises additional instructions to not switch from scheduling starting the internal combustion engine via the disconnect clutch to starting the internal combustion engine via the flywheel starter in response to the disconnect clutch being in in a disconnect clutch phase other than a boost phase or a fully open phase. In a fifth example that may include one or more of the first through fourth examples, the system includes where the switch from scheduling starting the internal combustion engine via the disconnect clutch to starting the internal combustion engine via the flywheel starter is performed during a transmission downshift. In a sixth example that may include one or more of the first through fifth examples, the system further comprises additional instructions to fully closed the disconnect clutch after starting the internal combustion engine.

Referring now to FIG. 3, a prophetic driveline operating sequence is shown. The operating sequence of FIG. 3 may be provided via the system of FIGS. 1 and 2 in cooperation with the methods of FIG. 4. The vertical lines at times t0-t3 represent times of interest during the operating sequence. The plots are time aligned.

The first plot from the top of FIG. 3 is a plot of a scheduled engine starting device (e.g., an engine starting device that is planned or expected to start the internal combustion engine) versus time. The vertical axis represents the scheduled engine starting device and the scheduled engine starting device may be the driveline disconnect clutch (DIS), the flywheel starter (FWS), or none. The horizontal axis represents time and time increases from the left side of the plot to the right side of the plot. Trace 302 represents the scheduled engine starting device.

The second plot from the top of FIG. 3 is a plot of driver demand pedal position versus time. The vertical axis represents the driver demand pedal position and the driver demand pedal position increases in the direction of the vertical axis arrow. The horizontal axis represents time and time increases from the left side of the plot to the right side of the plot. Trace 304 represents the driver demand pedal position.

The third plot from the top of FIG. 3 is a plot of an engine start state versus time. The vertical axis represents the engine start state and the engine start state is asserted (e.g., the engine has started) when trace 306 is at a level that is near the vertical axis arrow. The engine is not started when trace 306 is at a level that is near the horizontal axis. The horizontal axis represents time and time increases from the left side of the plot to the right side of the plot. Trace 306 represents the engine starting state.

The fourth plot from the top of FIG. 3 is a plot of engine speed versus time. The vertical axis represents the engine speed and engine speed increases in the direction of the vertical axis arrow. The horizontal axis represents time and time increases from the left side of the plot to the right side of the plot. Trace 308 represents the engine speed.

The fifth plot from the top of FIG. 3 is a plot of torque converter impeller speed versus time. The vertical axis represents the torque converter impeller speed and the torque converter impeller speed increases in the direction of the vertical axis arrow. The horizontal axis represents time and time increases from the left side of the plot to the right side of the plot. Trace 310 represents the torque converter impeller speed. Trace 312 represents the torque converter impeller speed for the target gear. Dashed line 350 represents the latched torque converter impeller speed for the present sequence. The distance between dash dot line 352 and dashed line 350 represents a torque converter impeller threshold speed value or level.

The sixth plot from the top of FIG. 3 is a plot of an engine start request state versus time. The vertical axis represents the engine start request state and the engine start state is asserted (e.g., an engine start is requested) when trace 312 is at a higher level that is near the vertical axis arrow. The engine start request is not asserted (e.g., an engine start is not requested) when trace 312 is at a lower level near the horizontal axis. The horizontal axis represents time and time increases from the left side of the plot to the right side of the plot. Trace 312 represents the engine start request state.

At time t0, the engine is not started nor is it scheduled to be started. The driver demand pedal is not applied the torque converter speed is at a middle level and an engine start request is not present. Such conditions may occur when a vehicle is coasting in electric vehicle mode where the electric machine (e.g., 240) provides torque or power to propel the vehicle.

At time t1, the vehicle operator (not shown) begins to apply the driver demand pedal, which initiates a transmission downshift (e.g., a shift from a numerically higher numbered gear ($3^{rd}$ gear) to a numerically lower numbered gear ($2^{nd}$ gear)) (not shown). The engine is not scheduled for starting and the engine remains off. The torque converter impeller speed has been reduced after time t0 as the vehicle coasts. An engine start is not requested.

At time t2, the engine start request is asserted in response to the increasing driver demand pedal position. The driveline disconnect clutch is scheduled to start the engine and the engine remains off and not rotating. The engine speed is zero and the torque converter impeller speed has fallen a small amount since time t1. The torque converter impeller speed is latched (e.g., the value is stored in controller memory at time t2 and the value is maintained until the value is cleared after the engine is started at time t4) at the level that is indicated by dashed line 350.

Between time t2 and time t3, the driver demand pedal position continues to increase and the disconnect clutch remains the scheduled engine starting device, but the driveline disconnect clutch has not completed its boost phase for the present engine start request (not shown). The torque converter impeller speed for the target gear increases since the target gear is a numerically lower gear. The engine is not started and the engine is not rotating.

At time t3, the torque converter impeller speed for the target gear minus the torque converter impeller latched speed is greater than the torque converter impeller speed threshold while the torque converter clutch has not exited a boost phase so the engine starting device is switched from the driveline disconnect clutch to the flywheel starter so that the higher driver demand may temporarily be met by the electric machine (e.g., 240 of FIG. 2) and so that there is not a significant change in inertia at the transmission input shaft, which may cause a driveline torque disturbance. Thus, by switching engine starting devices in response to an increasing driver demand, it may be possible to meet driver demand and reduce a possibility of driveline torque disturbances during transmission downshifting. The engine speed begins to increase shortly after time t3 as the flywheel starter begins to crank the engine. The engine remains off at time t3 and the torque converter impeller speed increases in response to the increased driver demand pedal position. The engine start request remains asserted.

At time t4, the engine starts and the flywheel starter is disengaged from the engine. The driver demand is unchanged since time t3 and the engine speed is increasing. The torque converter impeller speed has leveled off and the engine start request remains asserted so that the engine remains on (e.g., rotating and combusting fuel).

In this way, a scheduled engine starting device may be changed for an engine start during a transmission gear downshift to meet driver demand and reduce a possibility of driveline torque disturbances. The change of engine starting device may be based on a torque converter impeller speed for a target gear that is anticipated or predicted.

Referring now to FIG. 4, a method for operating an engine of a hybrid vehicle is shown. The method of FIG. 4 may be at least partially implemented as executable instructions stored in controller memory in the system of FIGS. 1 and 2. Further, the method of FIG. 4 may include actions taken in the physical world to transform an operating state of the system of FIGS. 1 and 2. Additionally, the method of FIG. 4 may provide at least portions of the operating sequence shown in FIG. 3. Method 400 may be performed while a hybrid vehicle is being propelled via an electric machine (e.g., 240 of FIG. 2).

At 402, method 400 determines vehicle operating conditions. Vehicle operating conditions may include but are not limited to vehicle speed, driver demand torque or power, driver urgency level, torque converter impeller speed, and state of battery charge. Method 400 proceeds to 404.

At 404, method 400 judges whether or not an engine start is requested. An engine start may be requested in response to a driver demand torque or power request that is generated via a driver applying the driver demand pedal, battery state of charge, an emission system temperature, a level of stored fuel vapor, and other vehicle operating conditions.

Method 400 may also latch values of variables just prior to an engine start request at 404. In particular, method 400 may store a present torque converter impeller speed in variable Ni_latch and method 400 may store a present torque multiplication ratio of the presently engaged transmission gear into variable rt_latch. In one example, the presently engaged transmission gear may reference a table or function that outputs a torque multiplication ratio for the presently engaged transmission gear to determine the value that is put into variable rt_latch.

If method 400 judges that an engine start is requested, the answer is yes and method 400 proceeds to 406. Otherwise, the answer is no and method 400 proceeds to exit.

At 406, method 400 selects and schedules a device for starting the internal combustion engine. In one example, method 400 determines vehicle operating conditions and references columns in a data selection matrix or data structure. The data structure or data selection matrix includes cells and the cells of columns may include parameters (e.g., X's) that link the vehicle operating considerations with the engine starting devices. To determine which engine starting device is activated to start the engine when a particular set of vehicle operating considerations are present, method 400 references the data structure or matrix via the present vehicle operating considerations and queries cells in the matrix that correspond to columns where the vehicle operating consideration is active. Based on the cells that contain parameters, method 400 determines a single row and the engine starting devices are selected according to the single row. In other words, method 400 references cells in the data selection matrix or data structure via columns, and contents of the cells indicate which individual row of the data matrix or data structure is relevant for the present vehicle operating conditions. The selected and scheduled engine starting device is determined from the individual row that is referenced by the columns since an individual engine starting device is assigned to each row. In this example, method 400 may select a driveline disconnect clutch as the engine starting device or method 400 may select the flywheel starter as the engine starting device. It should be noted that when the driveline disconnect clutch is selected as the engine starting device, torque to start the engine may be provided via the ISG or the vehicle's inertia through the driveline disconnect clutch and to the engine. Method 400 proceeds to 408 after the engine starting device is selected.

At 408, method 400 judges if a transmission gear downshift is requested or is in progress. If so, the answer is yes and method 400 proceeds to 410. Otherwise, the answer is no and method 400 proceeds to 430.

At 430, method 400 judges if the flywheel starter (FWS) is available to start the engine. The flywheel starter may be available if the flywheel starter is supplied with sufficient power from a battery to crank the engine and if the flywheel starter is operating as expected. The flywheel starter may not be available to start the engine if the flywheel starter is not supplied with sufficient power from the battery to crank the engine or if the flywheel starter is degraded. If method 400 judges that the flywheel starter is available to crank the engine, the answer is yes and method 400 proceeds to 432. Otherwise, the answer is no and method 400 proceeds to 434.

At 432, method 400 starts the engine via the presently scheduled engine starting device. For example, if the flywheel starter was determined to be scheduled at 406, method 400 starts the engine via the flywheel starter. On the other hand, if method 400 presently has the driveline disconnect clutch scheduled to start the engine, method 400 partially closes the driveline disconnect clutch and rotates the engine via torque generated by the electric machine or the vehicle's inertia while the vehicle is traveling on a road. The driveline disconnect clutch is fully closed after the engine is started. Method 400 proceeds to exit.

At 434, method 400 partially closes the driveline disconnect clutch and rotates the engine via torque generated by the electric machine or the vehicle's inertia while the vehicle is traveling on a road. The driveline disconnect clutch is fully closed after the engine is started. Method 400 proceeds to exit.

At 410, method 400 judges if the flywheel starter (FWS) is available to start the engine. If method 400 judges that the flywheel starter is available to crank the engine, the answer is yes and method 400 proceeds to 412. Otherwise, the answer is no and method 400 proceeds to 442.

At 412, method 400 judges whether or not the driveline disconnect clutch is scheduled to start the internal combustion engine. Scheduling the driveline disconnect clutch to start the engine may include determining a time at which the driveline disconnect clutch is to begin closing. The time that the driveline disconnect clutch begins to close may be a function of driver demand torque, vehicle speed, and other vehicle conditions. If method 400 judges that the driveline disconnect clutch has been selected to start the internal combustion engine, the answer is yes and method 400 proceeds to 414. Otherwise, the answer is no and method 400 proceeds to 442.

At 414, method 400 begins to perform the transmission gear downshift and method 400 begins performing the engine start via the driveline disconnect clutch. Method 400 may begin performing the transmission gear downshift by reducing pressure of fluid in an off going clutch (e.g., a clutch that is to release the numerically higher gear, such as third gear). Method 400 may begin performing the engine start via the driveline disconnect clutch by beginning to supply fluid (e.g., oil) to begin closing the driveline disconnect clutch from a fully open phase (e.g., where the driveline disconnect clutch is fully open and not transferring torque). Method 400 proceeds to 416.

At 416, method 400 determines variables for determining whether or not the scheduled engine starting device is to be changed. The variables may be variables for a target gear, a torque converter impeller speed for the target gear, and a torque multiplication ratio for the target transmission gear.

In one example, method 400 may predict a target gear according to a predicted driver demand torque or power, vehicle speed, and a shift schedule. For example, if driver demand torque is determined to be 20 Newton-meters (Nm) and driver demand torque is determined to be increasing at 2 Nm per second based on two driver demand torque values observed by the controller 50 milliseconds apart, the predicted driver demand torque in two seconds in the future is 24 Newton-meters (e.g., 20 Nm+(2*2 Nm)). The predicted driver demand torque and vehicle speed reference a shift schedule and the shift schedule outputs a gear that is a target or predicted gear. For example, a shift schedule may output $1^{st}$ gear as the predicted or target gear if the shift schedule is referenced by a present vehicle speed is 20 kilometers/hour and a predicted driver demand torque of 24 Nm. The shift schedule may output target or predicted gears for upshifts (e.g., from $1^{st}$ gear to second gear) and for downshifts (e.g., from $3^{rd}$ gear to $2^{nd}$ gear). The shift schedule may skip gears during upshifts or downshifts based on the predicted driver demand torque or power and the vehicle speed. For example, if the transmission is presently in $3^{rd}$ gear the shift schedule may output a value of $1^{st}$ gear when the shift schedule is referenced by the predicted driver demand torque and the present vehicle speed.

Method 400 may determine the torque converter impeller speed for the target gear by multiplying wheel speed by the vehicle's axle ratio and the target gear (e.g., Impeller speed=wheel speed*axle ratio*target gear ratio). Method 400 may determine the torque multiplication ratio for the target gear by referencing a table or function that outputs a torque multiplication ratio for the target transmission gear to determine the value that is put into variable rt_targ. The value of rt_targ may be blended based on transmission clutch capacities. Method 400 proceeds to 418.

At 418, method 400 judges whether or not to change the scheduled engine starting device from the driveline disconnect clutch to the flywheel starter. In one example, method 400 determines that the engine starting device is to be switched to the flywheel starter when the following logic is true:

If ((DIS_phase<boosting) && ((Ni_targ-Ni_latch-Ni_thresh)|| (rt_targ-rt_latch>rt_thresh)))

where DIS_phase is a variable that represents the present operating phase of the driveline disconnect clutch, boosting is a variable that represents one of the operating phases for the driveline disconnect clutch, && is a logical AND operator, Ni_targ is a variable that represents the torque converter impeller speed for the target gear, Ni_latch is a variable that represents the torque converter impeller speed that is latched when an engine start is first requested for the present engine start, Ni_thresh is a variable that represents a threshold torque converter impeller speed threshold, the vertical bars || represent a logical OR operation, rt_targ is a variable that represents a torque multiplication ratio for the target transmission gear, rt_latch is a variable that represents the torque multiplication ratio for the transmission gear that is engaged when the present engine start request is asserted, and rt_thresh is a variable that represents a threshold torque multiplication ratio. The driveline disconnect clutch may have the following operating phases fully open phase where pressure applied to the driveline disconnect clutch is less than a threshold pressure; a boost phase where pressure supplied to the driveline disconnect clutch is increased to stroke a piston within the driveline disconnect clutch and bring the driveline disconnect clutch to a position where clutch plates within the driveline disconnect clutch begin to touch without transmitting torque between the clutch plates; a hold phase where the driveline disconnect clutch piston stroke is held without increasing torque capacity of the driveline disconnect clutch; a torque transfer or ramping phase where the driveline disconnect clutch torque capacity is increased, but where the driveline disconnect clutch is not fully locked or closed; and a fully closed or locked phase where slip (e.g., a difference in speed between input side and output side of the driveline disconnect clutch) is less than a threshold amount (e.g., less than 10 revolutions/minute). It should be noted that the boost phase may be subdivided into a boost prime phase and a boost phase in some examples. For the logic (DIS_phase<boosting) to be true, the driveline disconnect clutch must be in a full open phase or a boost phase. The logic (DIS_phase<boosting) is false when the driveline disconnect clutch phase is a hold phase, torque transfer phase, or fully closed phase. The above if statement logic allows method 400 to judge if the transmission downshift is expected to be to a lower transmission gear than may be nominally occur. Method 400 proceeds to 440 when the above if statement logic is true. Method 400 proceeds to 420 when the above if statement logic is false.

At 440, method 400 changes or switches the scheduled engine starting device to the flywheel starter. By switching to the flywheel starter, the electric machine may meet driver demand torque while the engine is being started so that vehicle occupants notice a smooth torque progression. Further, the possibility of driveline torque disturbances may be reduced since the transmission need not simultaneously downshift and closed the driveline disconnect clutch. Method 400 proceeds to 442.

At 442, method 400 completes the transmission downshift and starts the engine via the flywheel starter. The transmission downshift may be completed via reducing pressure in one or more off-going clutches that disengage a numerically higher gear (e.g., $3^{rd}$ gear) and by increasing pressure in one or more on-coming clutches that engage the numerically lower gear (e.g., $1^{st}$ gear) for the downshift. The flywheel starter is engaged to the engine and the engine is rotated by the flywheel starter. Fuel and spark are delivered to the engine and the engine is started. Once the engine is started and the downshift is complete, method 400 proceeds to 424.

At 420, method 400 continues to perform the transmission downshift and method 400 continues to perform the engine start via the driveline disconnect clutch. The transmission downshift may be continued by releasing pressure in off-going clutches of a numerically higher gear (e.g., $3^{rd}$ gear) that is being disengaged and increasing pressure in on-coming clutches of a numerically lower gear (e.g., $1^{st}$ gear) that is being engaged. Method 400 may continue engine starting via supplying a boost pressure to stroke a piston in the driveline disconnect clutch to a position just before where torque may be transferred through the driveline disconnect clutch followed by operating the disconnect clutch in the hold and ramping phases. The engine is supplied with spark and fuel while the engine is rotated via an electric machine (e.g., 240 of FIG. 2) via closing the driveline disconnect clutch. Method 400 proceeds to 422.

At 422, method 400 judges whether or not the transmission gear downshift is complete and the engine is started. If so, the answer is yes and method 400 proceeds to 424. Otherwise, the answer is no and method 400 returns to 416.

At 424, method 400 fully closes the driveline disconnect clutch by increasing pressure of fluid that is supplied to the driveline disconnect clutch. Method 400 proceeds to exit.

In this way, method 400 may switch between engine starting devices to improve vehicle drivability. In addition, method 400 may base the engine starting device mode switching based on transmission operating conditions that may indicate that the transmission may be about to downshift more than an expected number of gears (e.g., more than one gear).

Thus, method 400 provides for a method for operating a vehicle, comprising: via a controller, starting an internal combustion engine via a flywheel starter in response to an engine start request while a driveline disconnect clutch is operating in a fully released phase or a boosting phase and based on a torque converter impeller speed for a target transmission gear and a torque multiplication ratio of the target transmission gear; and starting the internal combustion engine via a driveline disconnect clutch and an electric machine in response to the engine start request while the driveline disconnect clutch is not operating in the fully released phase or the boosting phase. In a first example, the method further comprises subtracting a latched torque converter impeller speed from the torque converter impeller speed for the target transmission gear. In a second example that may include the first example, the method further comprises subtracting a latched torque multiplication ratio from the torque multiplication ratio of the target transmission gear. In a third example that may include one or both of the first and second examples, the method further comprises scheduling starting of the internal combustion engine via the driveline disconnect clutch immediately prior to starting the internal combustion engine via the flywheel starter. In a fourth example that may include one or more of the first through third examples, the method further comprises downshifting a transmission while starting the internal combustion engine via the flywheel starter. In a fifth example that may include one or more of the first through fourth examples, the method further comprises propelling a vehicle via an electric machine while starting the internal combustion engine via the flywheel starter. In a sixth example that may include one or more of the first through fifth examples, the method further comprises downshifting a transmission while starting the internal combustion engine via the driveline disconnect clutch and the electric machine. In a seventh example that may include one or more of the first through sixth examples, the method further comprises propelling a vehicle via the electric machine.

Method 400 also provides for a method for operating a vehicle, comprising: via a controller, starting an internal combustion engine via a driveline disconnect clutch in response to a torque converter impeller speed for a target transmission gear minus a latched torque converter impeller speed being less than a threshold torque converter impeller speed or a torque multiplication ratio of the target transmission gear minus a latched torque multiplication ratio being less than a threshold torque multiplication ratio, and a driveline disconnect clutch being in a fully open phase or a boost phase. In a first example, the method further comprises starting the internal combustion engine via a flywheel starter in response to the driveline disconnect clutch not being in the fully open phase or the boost phase. In a second example that may include the first example, the method further comprises fully closing the driveline disconnect clutch in response to the internal combustion engine being started after starting the internal combustion engine via the flywheel starter. In a third example that may include one or both of the first and second examples, the method includes where a transmission is being downshifted while staring the internal combustion engine. In a fourth example that may include one or more of the first through third examples, the method further comprises propelling the vehicle via an electric machine while starting the internal combustion engine.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
during a transmission downshift, via a controller, starting an internal combustion engine via a flywheel starter in response to an engine start request while a driveline disconnect clutch is operating in a boosting phase and based on a torque converter impeller speed for a target transmission gear and a torque multiplication ratio of the target transmission gear; and
starting the internal combustion engine via the driveline disconnect clutch and an electric machine in response to the engine start request while the driveline disconnect clutch is not operating in the boosting phase,
where the boosting phase is where pressure supplied to the driveline disconnect clutch is increased to stroke a piston within the driveline disconnect clutch and bring the driveline disconnect clutch to a position where clutch plates within the driveline disconnect clutch begin to touch without transmitting torque between the clutch plates.

2. The method of claim 1, further comprising subtracting a latched torque converter impeller speed from the torque converter impeller speed for the target transmission gear, the latched torque converter impeller speed being a speed of a torque converter impeller immediately preceding the engine start request.

3. The method of claim 1, further comprising subtracting a latched torque multiplication ratio from the torque multiplication ratio of the target transmission gear, the latched torque multiplication ratio being a torque multiplication ratio immediately preceding the engine start request.

4. The method of claim 1, further comprising scheduling starting of the internal combustion engine via the driveline disconnect clutch immediately prior to starting the internal combustion engine via the flywheel starter.

5. The method of claim 1, further comprising propelling the vehicle via the electric machine while starting the internal combustion engine via the flywheel starter.

6. The method of claim 1, further comprising propelling the vehicle via the electric machine.

7. A system, comprising:
an internal combustion engine;
an integrated starter/generator;
a disconnect clutch positioned in a driveline between the internal combustion engine and the integrated starter/generator;
a transmission included in the driveline;
a flywheel starter; and
a controller including executable instructions stored in non-transitory memory that cause the controller to switch from scheduling starting the internal combustion engine via the disconnect clutch to starting the internal combustion engine via the flywheel starter during a transmission downshift, in response to the disconnect clutch being in a boost phase and further based on a difference between a torque converter impeller speed for a target transmission gear and a latched torque converter impeller speed, the latched torque converter impeller speed being a speed of a torque converter impeller immediately preceding the engine start request;
where the boost phase is where pressure supplied to the driveline disconnect clutch is increased to stroke a piston within the driveline disconnect clutch and bring the driveline disconnect clutch to a position where clutch plates within the driveline disconnect clutch begin to touch without transmitting torque between the clutch plates.

8. The system of claim 7, further comprising additional instructions to switch from scheduling starting the internal combustion engine via the disconnect clutch to starting the internal combustion engine via the flywheel starter in response to a difference between a target torque multiplication ratio of the target transmission gear and a latched torque multiplication ratio, the latched torque multiplication ratio being a torque multiplication ratio immediately preceding the engine start request.

9. The system of claim 7, where the internal combustion engine is started via the flywheel starter in further response to an engine start request.

10. The system of claim 7, further comprising additional instructions to not switch from scheduling starting the internal combustion engine via the disconnect clutch to starting the internal combustion engine via the flywheel starter in response to the disconnect clutch being in the boost phase or a fully open phase.

11. The system of claim 7, further comprising additional instructions to fully closed the disconnect clutch after starting the internal combustion engine.

12. A method for operating a vehicle, comprising:
during a transmission downshift, via a controller, starting an internal combustion engine via a flywheel starter in response to a torque converter impeller speed for a target transmission gear minus a latched torque converter impeller speed being greater than a threshold torque converter impeller speed or a torque multiplication ratio of the target transmission gear minus a latched torque multiplication ratio being greater than a threshold torque multiplication ratio, and a driveline disconnect clutch being in a boost phase, the latched torque multiplication ratio being a torque multiplication ratio immediately preceding the engine start request;
where the boost phase is where pressure supplied to the driveline disconnect clutch is increased to stroke a piston within the driveline disconnect clutch and bring the driveline disconnect clutch to a position where clutch plates within the driveline disconnect clutch begin to touch without transmitting torque between the clutch plates.

13. The method of claim 12, further comprising starting the internal combustion engine via the driveline disconnect clutch in response to the driveline disconnect clutch not being the boost phase.

14. The method of claim 12, further comprising fully closing the driveline disconnect clutch in response to the internal combustion engine being started after starting the internal combustion engine via the flywheel starter.

15. The method of claim 12, further comprising propelling the vehicle via an electric machine while starting the internal combustion engine.

\* \* \* \* \*